United States Patent
Milicevich

(10) Patent No.: US 6,964,563 B1
(45) Date of Patent: Nov. 15, 2005

(54) CANDLE RE-TOPPER

(76) Inventor: Mitchell Craig Milicevich, 3602 Vista Grande, Shingle Springs, CA (US) 95662

(*) Notice: Subject to any disclaimer, the term of this patent is extended or adjusted under 35 U.S.C. 154(b) by 336 days.

(21) Appl. No.: 10/154,731

(22) Filed: May 23, 2002

(51) Int. Cl.$^7$ .................. B29C 31/00; F23D 3/16
(52) U.S. Cl. ............... 425/215; 425/383; 425/803; 431/294; 220/745; 220/912
(58) Field of Search .................. 425/803, 112, 215, 425/383; 249/117, 121, 141; 431/292, 294; 220/745, 912, 752

(56) References Cited

U.S. PATENT DOCUMENTS

| | | | |
|---|---|---|---|
| D119,507 S | 3/1940 | von Bilkau | |
| D119,776 S | 4/1940 | von Bilkau | |
| 2,541,725 A | 2/1951 | Sundell | 67/22 |
| 2,680,963 A | 6/1954 | Churchill | 67/27 |
| 3,844,706 A * | 10/1974 | Tsaras | 44/275 |
| D237,012 S | 9/1975 | Steinhart | D26/4 |
| D239,569 S | 4/1976 | Eker | D26/1 |
| D288,842 S | 3/1987 | Kwiatkowski | D23/72 |
| 4,755,135 A | 7/1988 | Kwok | 431/290 |
| 5,078,945 A * | 1/1992 | Byron | 425/803 |
| D373,500 S | 9/1996 | Lee | D7/598 |
| 6,153,137 A * | 11/2000 | Youn et al. | 425/803 |
| 6,220,855 B1 * | 4/2001 | Asheim | 425/803 |
| D450,861 S | 11/2001 | Murdick | D26/7 |
| 2001/0005573 A1 | 6/2001 | Furner et al. | 431/292 |

FOREIGN PATENT DOCUMENTS

GB 2 067 739 7/1981 ............. F23D 3/16

* cited by examiner

Primary Examiner—Robert Davis
Assistant Examiner—Thu Khanh T. Nguyen
(74) Attorney, Agent, or Firm—Sierra Patent Group, Ltd.

(57) ABSTRACT

A manufacture for melting wax shoulders from candles is a receptacle having a top, bottom and sides. Connected to the receptacle are a spout and at least one handle. The top of the receptacle has a recessed area having walls and a central conical area, which has a central hole and at least one hole lateral thereto. Also disclosed is a method of melting a shoulder off the top of a candle, which has the steps of providing a candle with excess wax in the form of shoulders, providing a conical surface with at least one hole to drain wax, heating the conical surface to a temperature sufficient to melt the candle; and placing the top of the candle in contact with the heated conical surface until at least a portion of the shoulders have melted.

8 Claims, 2 Drawing Sheets

VIEW B-B

CANDLE RE-TOPPER

BACKGROUND

1. Technical Field

The invention relates to a device for removing excess wax from the perimeter of a candle.

2. The Prior Art

Conventionally, a candle is a source of light. It has a cylindrical shape and burns with an open flame. Commonly, candles consist of tallow, spermaceti, bees' wax or paraffin wax, with an embedded wick that draws the fuel up by capillary action. Generally, the burning properties of such candles do not achieve the desired ideal. Ideally, a candle should burn continuously and steadily with a large luminous flame. The wax of the body of the candle should be melted to such an extent by the flame as to form a molten dish of wax and gradually melt down the entire candle, so that a perimeter wall, or shoulder, does not form. In pillar and wide taper candles, the molten dish of wax frequently does not extend to the outer surface of the candle, and the candle develops shoulders. The shoulders interfere with burning of the candle. As the shoulders develop, the candle may stop burning, the owner is burned reaching into the candle to light it, and matches may accumulate in the wax, giving the candle an untidy appearance. In an effort to use the candle, the owner may attempt to remove the excess wax with a sharp knife, which is dangerous and often leaves the candle misshapen.

What is needed is an easy, safe way to remove the shoulders from candles and produce an attractive, usable candle.

SUMMARY OF THE INVENTION

A manufacture for melting wax shoulders from candles is a receptacle having a top, bottom and sides. Connected to the sides of the receptacle are a spout and at least one handle. The top of the receptacle has a recessed area having walls and a central conical area, which has a central hole and at least one hole lateral thereto. Also disclosed is a method of melting a shoulder off the top of a candle, which has the steps of providing a candle with excess wax in the form of shoulders, providing a conical surface with at least one hole to drain wax, heating the conical surface to a temperature sufficient to melt the candle; and placing the top of the candle in contact with the heated conical surface until at least a portion of the shoulders have melted.

BRIEF DESCRIPTION OF THE DRAWING FIGURES

DETAILED DESCRIPTION OF A PREFERRED EMBODIMENT

The candle re-topper kettle was developed for people to re-top previously burned pillar and taper candles and make them usable and attractive again.

Figure 1:
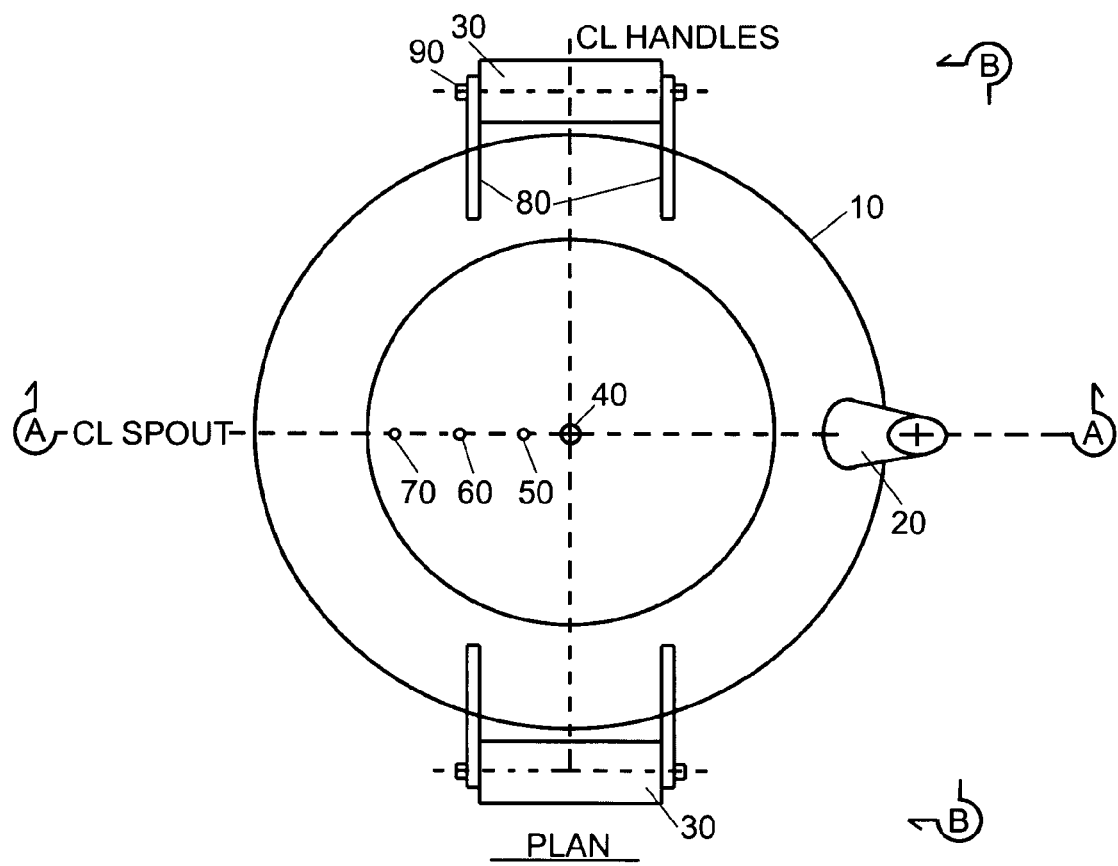
FIG. 1 is a top plan view of the retopping kettle.

A preferred embodiment shown in FIG. 1 resembles a tea kettle or tea pot 10 in that it is round, has a spout 20 and handles 30. While FIG. 1 shows a round shape, any shape will work. The kettle is about 10½" (26.7 cm) wide and 5" (12.7 cm) tall. There is a central hole 40 of about ¼" (0.6 cm) diameter, through which wax drains. Lateral to the central hole are three holes 50, 60 and 70 which also drain wax from candles of increasing diameters.

The spout 20 is shown as being tapered. The spout may be any shape that permits it to efficiently drain melted wax and hot water from the kettle.

The handles 30 are comprised of supports 80 which are welded (not shown) to the side of the kettle. It is understood that the handles also can be bolted or riveted to the side of the kettle. As shown, the handle is attached to the supports by means of metal head screws 90. The handles are made of non-burnable, non-conductive materials including, but not limited to, porcelain, painted wood, composite or comparable material. Two handles are not required; the supports may be joined in a hinge to a single handle, as shown in U.S. Des. 373,500. In such a configuration, the kettle can be carried with the handle up, and the handle is pushed to the side to melt the shoulders of wax off a candle.

Figure 2:
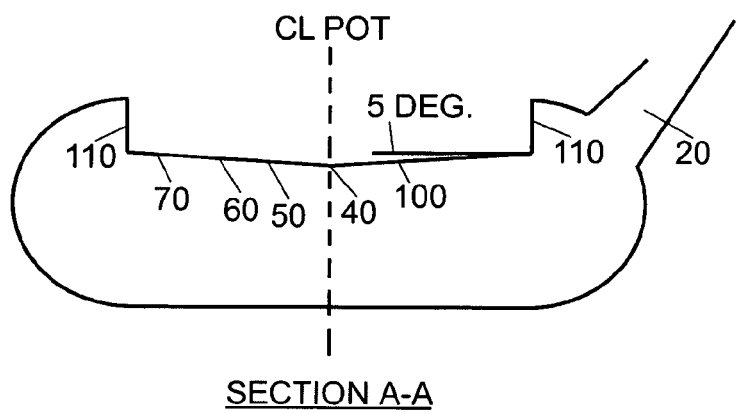
FIG. 2 is a cross-sectional view of the kettle taken along line A of FIG. 1.

In FIG. 2 which is a cross-sectional view of the re-topping kettle, it can be seen that the receptacle differs from the usual tea kettle in that kettle 10 has a recessed area 100. The recessed area forms the top of the kettle and is centered in the middle thereof. As shown, the recessed area 100 has sides 110. The sides are shown as being about ¾" (1.9 cm) deep. The recessed area is about 1¼" (3.2 cm) deep in the center. This configuration forms a cone shape of about 5 degrees from the horizontal. This is designed to give a slight taper to the processed candle. However, the angle of the cone can vary from 0 degrees to 45 degrees.

The recessed area 100 has the central hole 40 and laterally spaced holes 50, 60 and 70. In this embodiment, central hole 40 has a diameter of ¼ inch (0.6 cm), lateral holes 50 and 60 have diameters of 1/16 inch (1.6 mm) and lateral hole 70 has a diameter of 3/32 inch (2.4 mm). The diameters and locations of the holes can be varied but must accommodate prompt drainage of the melted wax.

Figure 3:
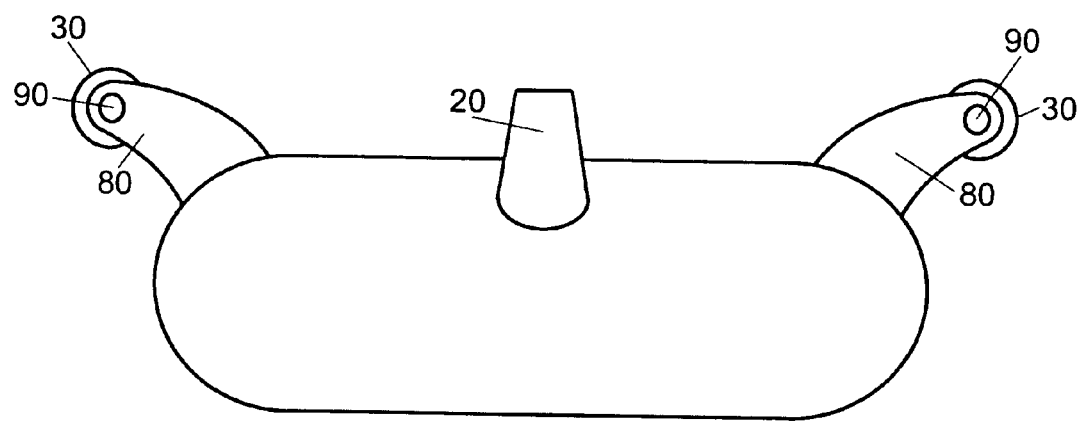
FIG. 3 is a side view of the kettle taken along line B of FIG. 1.

FIG. 3 shows the handles in more detail. In this embodiment, the handle 30 is 3¼ inches (cm) wide and 1⅛ inches (2.9 cm) in diameter. The handle is threaded to accommodate two screws 90 at either end of the handle. The screws are 1¼ inch (3.2 cm) long and ⅛ inch (3.2 mm) in diameter. Preferably the supports 80 are made of metal or a material compatible with the kettle and are ⅛ inch (3.2 mm) thick.

The receptacle or kettle can be made of a variety of metals including, but not limited to, stainless steel, enamel coated metals, comparable alloys, ceramic and other materials. The preferred thickness is 16 gauge; however, other thicknesses will work.

Many options are available with respect to the shape of the body and with respect to the design of cover and handles adapted to be used in association with a wax melting receptacle.

In another embodiment, a controlled heating element can be incorporated into the bottom surface of the receptacle, thus obviating the need to place the receptacle on a stove. Preferably, there is an on-off switch and a thermostat set so that the recessed area maintains enough heat to melt typical candles.

INDUSTRIAL APPLICABILITY

The candle re-topper kettle was developed to enable people to re-top previously burned pillar and taper candles which have grown shoulders and to make the candles usable and attractive again. The basic operation of this invention allows an individual to fill the kettle with water, heat the water, place a candle upside down into the inverted recessed cone and hold the candle thusly until the desired shape is reached. Excess wax melts and falls into the kettle and mixes with hot water. Both water and wax are discarded by pouring out the spout.

What is claimed is:

1. A manufacture for melting wax shoulders from candles, said manufacture comprising
   a) a receptacle having a top, bottom and sides;
   b) a spout arranged on one side of the receptacle;
   c) at least one handle attached to the receptacle;
   d) on the receptacle top, a recessed area having walls and a central conical area; and
   e) the conical area having a central hole and at least one hole lateral thereto.

2. The manufacture of claim 1 wherein the at least one hole lateral thereto comprises three holes lateral thereto.

3. The manufacture of claim 1 wherein the receptacle is round.

4. The manufacture of claim 1 wherein the receptacle is a kettle.

5. The manufacture of claim 1 wherein the receptacle is about 26.7 cm wide and 12.7 cm tall.

6. The manufacture of claim 1 wherein the central hole is about 0.6 cm in diameter.

7. The manufacture of claim 1 wherein the at least one hole lateral thereto has a diameter of about 1.6 mm.

8. The manufacture of claim 1 wherein the at least one hole lateral thereto has a diameter of about 2.4 mm.

* * * * *